April 19, 1932.  E. A. BUTLER ET AL  1,854,980
STROBOSCOPIC APPARATUS
Filed May 7, 1928    2 Sheets-Sheet 1

Inventor
Edward A. Butler
Theodore R. Olive
by Barton A. Bean
Attorney

April 19, 1932.  E. A. BUTLER ET AL  1,854,980
STROBOSCOPIC APPARATUS
Filed May 7, 1928    2 Sheets-Sheet 2

Inventor
Edward A. Butler
Theodore R. Olive
by Barton A. Bean Jr.
Attorney

Patented Apr. 19, 1932

1,854,980

UNITED STATES PATENT OFFICE

EDWARD A. BUTLER, OF BUFFALO, AND THEODORE R. OLIVE, OF NEW YORK, N. Y., ASSIGNORS, BY MESNE ASSIGNMENTS, TO ROBERT DONNER, OF BUFFALO, NEW YORK

STROBOSCOPIC APPARATUS

Application filed May 7, 1928. Serial No. 275,678.

This invention relates to stroboscopes or devices for measuring or determining the speed of rotation or movement of moving objects and for studying the variations in movement thereof.

In devices heretofore proposed to serve the purpose of this invention, there have been provided means for illuminating the object to be observed, together with a rotating disk or the like having an aperture therein, and means for driving the disk whereby the aperture will come into registration or line with the eye of the observer with a predetermined frequency. There have also been provided devices of the so-called neon type in which generally a magneto provided with a tachometer supplies high frequency alternating current to a neon lamp the light from which is directed upon a moving object. The speed of the magneto is regulated by means of a suitable change speed device interposed between it and the motor until the frequency of the current generated thereby and the light beam coincide with the cyclic frequency of movement of the object under observation. Under such conditions the object appears to be stationary and the rapidity of motion of the object is indicated by the tachometer.

The disadvantage of these types of structure has been lack of accuracy in the reading of the cyclic frequency offered. With respect to the first-mentioned type definite and accurate readings have been impossible at certain speeds due to the fact that an immediate and abrupt cutting off or interruption of the light beam does not take place. Furthermore, these devices have been limited in their application due to the fact that the rotating disk has one standard sized opening which can be used only at certain speeds and on certain classes of work. With respect to the second class of devices, that is to say the neon type, it has been found that there is an inherent and variable error by reason of the well known physical fact that the intervals of darkness between the intervals of light are of irregular and uncertain duration at high frequencies, and inasmuch as it is essential for accuracy that both of these intervals be relatively accurate, this type of device is not reliable over a range of variable speeds.

One object of the present invention is to provide a device of the character referred to which is of relatively simple construction, readily portable and which is susceptible of ready use by the millwright and factory engineer as well as by research and more technically trained persons.

A further object is to provide a device which will be substantially universal in its application and permit of a wide variety of uses and observations such as examining shafts, gears, cams, shuttles and the like, or any body having a high cyclic frequency whether rotary, reciprocatory or oscillatory and is equally applicable in disclosing conditions of unbalance in cyclic moving masses and the points and speeds where such unbalance occurs.

Another object is to provide a variable means of indicating the results of the observation which are not subject to the errors heretofore complained of.

Further objects will appear in the following specification and claims.

Figure 1:
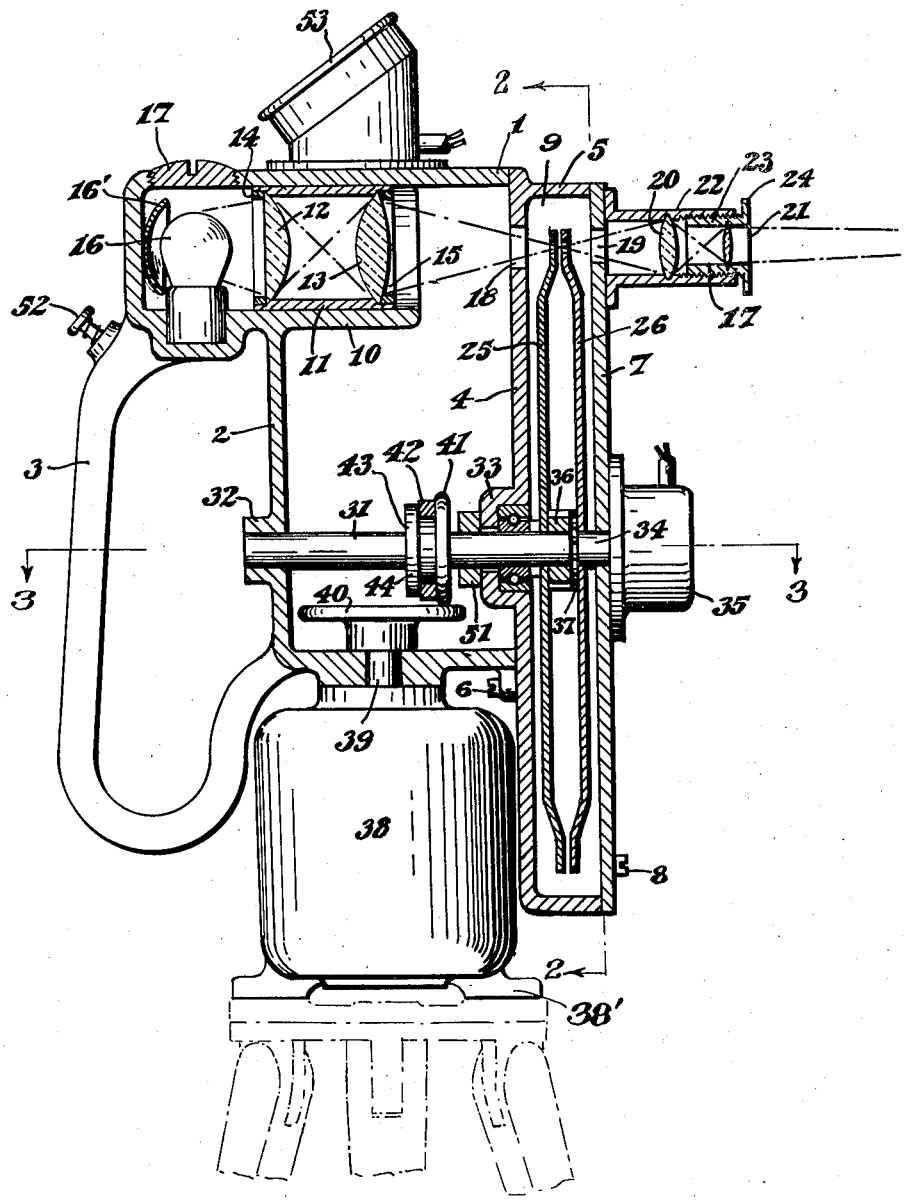
Fig. 1 is a vertical longitudinal section through the device.

Referring to the drawings, the device is shown as comprising a housing 1 formed with a rear wall 2 and provided with a handle 3 by means of which the device may be carried about and the light beam quickly projected in any direction. A circular plate 4 having a forwardly extending peripheral flange 5 is detachably secured to the housing 1 by screws 6 and to the flange 5 of this plate a circular cover plate 7 is detachably secured by screws 8. The plates 4 and 7 together form a relatively narrow chamber or compartment 9, the purpose of which will hereinafter be described.

The housing 1 is also formed with a barrel portion 10 in the upper portion of the rear wall 2 thereof within which a cylindrical lens holder 11 is mounted. In this holder a pair of suitable lenses 12 and 13 are fixed in proper spaced relation by means of rings 14 and 15. A source of light such as an electric lamp bulb 16 and reflector 16' are also mounted in the barrel portion 10 in the rear of the lenses 12 and 13 and to which access may be obtained through an opening which is normally closed by a screw cap 17.

A beam of light from the lamp 16 is directed through the lenses 12 and 13 and is concentrated and directed thereby through relatively small alined openings 18 and 19 in the plates 4 and 7 respectively and thence through a pair of focusing lenses 20 and 21 against the moving object under examination. The lens 20 is fixed in a tubular member 22 which is suitably secured to the cover plate 7 of the chamber 9 and the lens 21 is fixed in a holder 23 which is threaded into the member 22 and which is provided with a knurled flange 24 by means of which the holder and lens 21 carried thereby may be adjusted toward and from the lens 20 in order to obtain the proper focus of the light beam.

Figure 2:
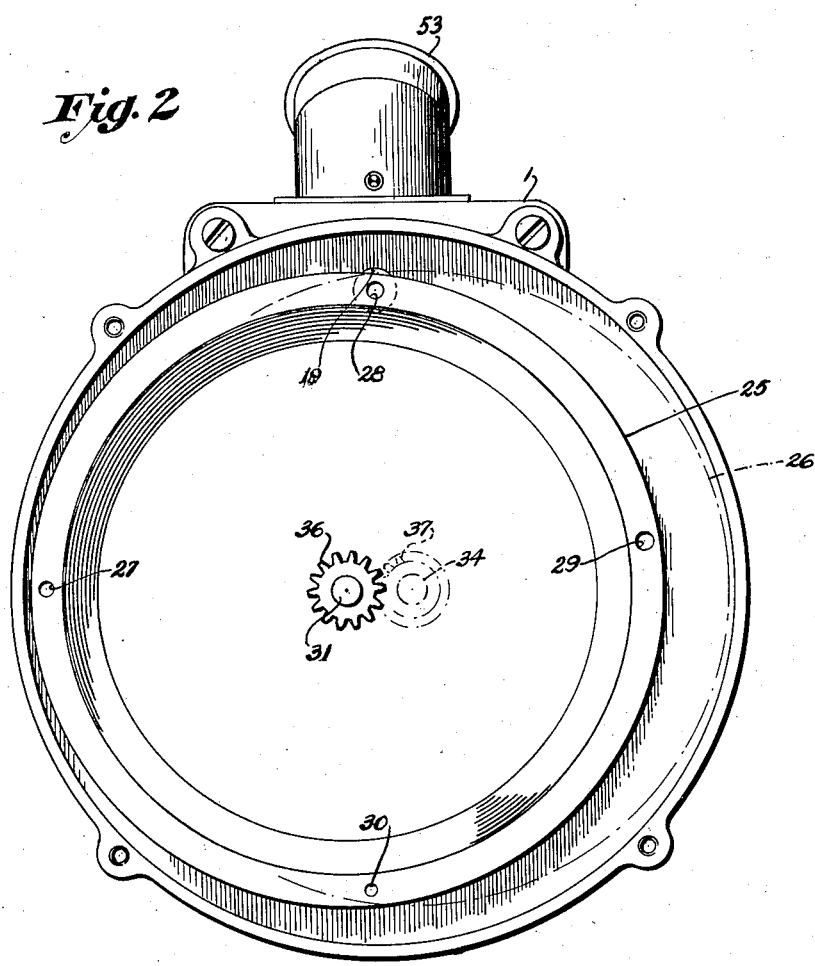
Fig. 2 is a view taken on the line 2—2 of Fig. 1 with the cover plate removed and illustrating the relative eccentricity of the interrupters or frequency changing elements.

In order to obtain the necessary stroboscopic effect of the beam of light, a pair of oppositely rotatable interrupters or frequency changing means in the form of disks 25 and 26 are provided which are eccentrically mounted in overlapping relation within the chamber 9 and which are of sufficient diameter to extend between the light openings 18 and 19 in the plates 4 and 7. Each of these disks is provided with a series of peripheral openings 27, 28, 29 and 30 of different sizes, (Fig. 2), which are adapted to periodically register with the light openings 18 and 19 as the disks are rotated. The openings in each of the disks 25 and 26 are spaced varying angular distances apart so that when the disks are adjusted angularly to cause an opening of a certain size in one of the disks to register with an opening of corresponding size in the other disk at the point where the light beam passes through the opening 18, none of the other openings will register at this particular point. The openings 27, 28, 29 and 30 are of different sizes so that the amount of light passing therethrough may be regulated according to the speed of the object under examination or its distance from the operator or both.

The disk 25 is fixed to one end of a drive shaft 31 which projects a short distance into the chamber 9 and which is journalled in bearings 32 and 33 formed in the rear wall of the housing 1 and plate 4 of the chamber 9, and the disk 26 is fixed to one end of a rotor shaft 34 of an electric generator 35 which is secured to the exterior of the plate 7, the purpose of which will be hereinafter set forth. The disks 25 and 26 are caused to rotate at the same peripheral speed by intermeshing gear wheels 36 and 37 which are keyed to the ends of the drive shaft 31 and the rotor 34 respectively.

Figure 3:
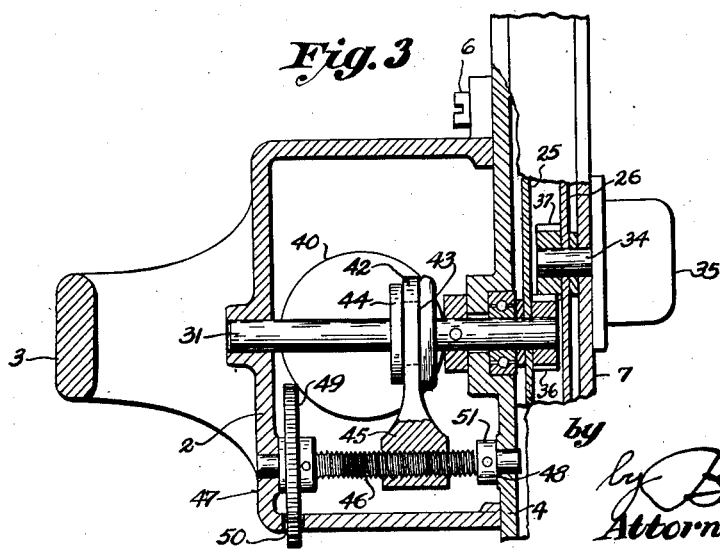
Fig. 3 is a fragmentary transverse sectional view taken on the line 3—3 of Fig. 2 and illustrating the mechanism for driving the interrupters and for varying the speed thereof.

The disks 25 and 26 are rotated by means of a high speed electric motor 38 which is exteriorly mounted on the lower portion of the housing 1, and which is provided with suitable means 38' for attachment to a tripod if so desired. The shaft 39 of this motor extends vertically into the housing 1 and is provided at its upper end with a friction drive wheel or disk 40. This wheel is adapted to be frictionally engaged by a similar wheel 41 which is keyed for axial sliding movement on the shaft 31. The wheel 41 may be adjusted along the shaft 31 and radially toward and away from the center of the wheel 40 by means of a bifurcated member or fork 42 which engages an annular channel 43 formed in the hub 44 of the wheel 41. The other end of the member 42 is provided with an interiorly screw threaded bearing 45, (Fig. 3), for engagement with an adjustment screw 46 which is rotatably mounted in bearings 47 and 48 formed in the rear wall 2 of the housing 1 and the plate 4. The screw 46 may be rotated in order to shift the position of the wheel 41 radially with respect to the wheel 40 and to thus vary the speed of rotation of the disks 25 and 26 in a well known manner, by means of a knurled thumb wheel or nut 49 which is fixed to one end of the screw 46 and which projects through a slot 50 in the housing 1 sufficiently to be readily accessible to the operator. The screw 46 is prevented from becoming displaced axially by the thumb wheel 49 at one end and a collar 51 fixed to the screw at the other end thereof. The chamber 9 in which the disks rotate not only protects the operator from these rapidly moving parts but prevents dirt from accumulating on the disks and disturbing their dynamic balance. Also this chamber protects these parts from air currents.

The lamp bulb 16 and the motor 38 may be both connected to or disconnected from a source of electric current by a suitable switch 52 conveniently arranged on the handle 3 of the device.

The armature of the generator 35, previously referred to, is rotated at the same peripheral speed as the disks 25 and 26. As a result an alternating current is induced as the disks are rotated. The coils of the stator member of the generator are electrically connected to a suitable meter 53 which is mounted on the upper portion of the housing 1 in a position where it may be easily observed by the operator. The dial of this meter is preferably graduated so as to indicate rotations per minute of the disks 25 and 26 rather than the frequency of the current generated by the generator, thus eliminating the necessity of any mathematical calculations by the operator in determining the cyclic frequency of the object being examined.

In operation, the beam of light from the device is directed upon an object, a rapidly rotating gear wheel for example, and the speed of rotation of the disks 25 and 26 then adjusted by the thumb wheel 49 and screw 46 until the object appears to become stationary. When this condition prevails, it signifies that the disks 25 and 26 are rotating in synchronism with the gear. The rotations per minute of the object under observation are then accurately indicated on the meter 53. Under such conditions, the object may be examined for flaws or defects and it may be made to appear to rotate slowly backwards or forwards by simply increasing or decreasing the speed of the disks 25 and 26 so that the entire periphery of the gear may be examined.

In the event that conditions render it necessary to employ smaller or larger openings in the disks 25 and 26, it is only necessary to remove the cover plate 7 and to rotate the disks independently of each other sufficiently to align openings therein of the desired size and then to replace the plate, the teeth of the gears 36 and 37 intermeshing in their new positions. In order to insure that the teeth of the gears will mesh accurately after such adjustment the openings in the disks are formed in definite predetermined positions relative to the gear teeth. It will be understood that the device may be provided with any suitable commercial speed counter if so desired.

From the foregoing, it will be apparent that a very rugged and efficient device is provided which will quickly and accurately indicate the cyclic frequency of an object or flaws or defects existing therein and one in which the inaccuracies, and other objections, heretofore encountered are eliminated.

The illustrated embodiment of the invention may be modified in construction and arrangement without departing from the scope of the invention, as defined in the appended claims.

We claim:

1. A device for observing objects operating at high frequencies comprising a pair of oppositely rotatable members disposed in overlapping relation with respect to each other and each having an opening therein adapted to register with the opening in the other at a predetermined point in their paths of travel, means associated with both of said members for varying the speed of rotation of said members, and means for projecting a beam of light through the openings in said members at their point of registry.

2. A device for observing objects operating at high frequencies, comprising a pair of rotatable disks associated for rotation in opposite directions at equal speeds and disposed in overlapping relation with respect to each other and each having an opening therein adapted to register with the opening in the other at a predetermined point, means for varying the speed of rotation of said disks, and means for projecting a beam of light through the openings in said members at their point of registry.

3. A stroboscopic apparatus comprising a pair of relatively movable members disposed in overlapping relation with respect to each other and each having a plurality of openings of different sizes provided therein, said members being adapted to be mounted in different phase relationships to selectively cause an opening of a certain size in one of said members to register with an opening of corresponding size in the other of said members at a predetermined point, means for varying the speed of the relative movement of said members, and means for projecting a beam of light through the openings in said members at their point of registry.

4. A stroboscopic apparatus comprising a pair of disks mounted for rotation in opposite directions about different spaced axes and disposed in overlapping relation with respect to each other, each of said disks having a plurality of openings of different sizes provided therein, said members being adapted to be mounted in different angular positions to selectively cause an opening of a certain size in one of said members to register with an opening of corresponding size in the other of said members at a predetermined angular position, means for varying the speed of rotation of said members, and means for projecting a beam of light through the openings in said members at their point of registry.

5. A stroboscopic apparatus comprising a pair of eccentrically mounted, oppositely rotatable members disposed in overlapping relation with respect to each other and each having an opening therein adapted to register with the opening in the other at a predetermined point, means for projecting a beam of light through the openings in said members at their point of registry and upon a rotating object, means for adjusting the speed of rotation of said members to correspond to that of said object, a generator driven by said members and at a corresponding speed for generating an electric current, and a meter for indicating the effect of said current in terms of the rotations per minute of said members.

6. A stroboscopic apparatus for examining rapidly moving objects comprising a pair of eccentrically mounted, oppositely rotatable members disposed in overlapping relation with respect to each other and each having an opening therein adapted to register with the opening in the other at a predetermined point, and means for adjusting the speed of rotation of said members to correspond to the cyclic frequency of the object under examination, whereby light rays impinging on said object between a light source and point of observation will be interrupted a number of times corresponding to the cyclic frequency of the object.

7. A stroboscopic apparatus comprising a pair of oppositely rotatable members disposed in overlapping relation with respect to each other and each having an opening therein adapted to register with the opening in the other at a predetermined point, and means for synchronizing the speeds of rotation of said members whereby the light passage effected by said registering openings will be centralized at said predetermined point.

8. Apparatus for observing an object operating at high frequencies, comprising a portable casing, a source of light within said casing, means for concentrating and directing the light from said source upon the object to be observed, means within said casing for interrupting the light passing out from the source of light and the concentrating and directing means, and means carried by said casing and operatively associated with said interrupting means for indicating the frequency of light interrupting cycles of said interrupting means.

EDWARD A. BUTLER.
THEODORE R. OLIVE.